(12) United States Patent
Konja et al.

(10) Patent No.: US 7,747,005 B2
(45) Date of Patent: Jun. 29, 2010

(54) OPENING AND CLOSING MECHANISM, AND ELECTRONIC DEVICE

(75) Inventors: Takehiko Konja, Fukui (JP); Kazushige Yamazaki, Fukui (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 11/483,737

(22) Filed: Jul. 11, 2006

(65) Prior Publication Data

US 2007/0022567 A1    Feb. 1, 2007

(30) Foreign Application Priority Data

Jul. 26, 2005    (JP)    ............... 2005-215354

(51) Int. Cl.
*H04M 1/00* (2006.01)
*H04M 9/00* (2006.01)
*E05F 1/08* (2006.01)
*E05F 1/14* (2006.01)

(52) U.S. Cl. ................... 379/433.13; 16/285; 16/303

(58) Field of Classification Search ............ 379/433.13; 16/324, 328, 330, 285
See application file for complete search history.

(56) References Cited

U.S. PATENT DOCUMENTS 4,186,905 A * 2/1980 Brudy ................. 248/478
5,109,571 A * 5/1992 Ohshima et al. ............... 16/307
5,923,751 A * 7/1999 Ohtsuka et al. ......... 379/433.13
5,966,776 A * 10/1999 Ona ............................ 16/328
6,658,699 B2 * 12/2003 Huong ........................ 16/330

FOREIGN PATENT DOCUMENTS

| CN | 1309859 | 8/2001 |
|---|---|---|
| JP | 3101910 | 6/2004 |
| JP | 2004-245342 | 9/2004 |
| JP | 2004-332861 | 11/2004 |
| JP | 2005-069468 | 3/2005 |
| WO | 98/49814 | 11/1998 |

* cited by examiner

*Primary Examiner*—Fan Tsang
*Assistant Examiner*—Phylesha Dabney
(74) *Attorney, Agent, or Firm*—Wenderoth, Lind & Ponack, L.L.P.

(57) ABSTRACT

An opening and closing mechanism includes a fixed member which has a fixed cam on its side face; a movable member which has a movable cam on an opposing face to the fixed cam, and which is rotatably disposed relative to the fixed member; a case housing the fixed member and the movable member; and a spring applying a force toward the fixed member to the movable member. The movable member has a recess at its radial center, and the first end of the spring is inserted in this recess.

8 Claims, 3 Drawing Sheets

OPENING AND CLOSING MECHANISM, AND ELECTRONIC DEVICE

BACKGROUND OF THE INVENTION

1. Field of the Invention

The present invention relates to opening and closing mechanisms used in a range of electronic devices such as mobile phones and personal computers, and also relates to electronic devices using the opening and closing mechanisms.

2. Background Art

With electronic devices such as mobile phones and personal computers becoming increasingly smaller and lighter, many products are adopting designs that attach a movable housing to a fixed housing in an openable and closable fashion, a so-called folding design. The opening and closing mechanisms used in these folding electronic devices are also required to be downsized while ensuring reliable opening and closing operations.

A conventional opening and closing mechanism is described next with reference to FIGS. 4 and 5. In the drawings, a sectional view is radially enlarged for easier understanding of the relation between a fixed cam and a movable cam.

FIG. 4 is a sectional view and FIG. 5 is an exploded perspective view of the conventional opening and closing mechanism. In the drawings, roughly cylindrical fixed member 51 is made of metal, and fixing section 51A is formed on its left side face. A pair of fixed cams 52 are formed on the periphery of a right side face of this fixed member 51. Each of these fixed cams 52 includes protrusion 52A and two sloped portions 52B and 52C extending upward and downward from protrusion 52A.

Movable member 53 is also roughly cylindrical and made of metal. This movable member 53 is disposed in a rotatable fashion in opening and closing directions and also in an axially-movable fashion relative to fixed member 51. A pair of movable cams 54 are provided on the periphery of a left side face of movable member 53, which is an opposing face to fixed cams 52.

Case 55 is roughly cylindrical and made of metal. Fixed member 51 and movable member 53 are housed in this case 55. Spring 56 is slightly compressed and placed between latching part 53A on a right side face of movable member 53 and an inner side face of case 55. This spring 56 applies a leftward force to movable member 53, and thus tips of movable cams 54 resiliently contact sloped portions 52B of fixed cams 52.

Furthermore, a left end of roughly columnar fixed shaft 57 is secured to fixed member 51. Fixing section 51A of this fixed member 51 rotatably protrudes from a left side face of case 55. A right end of fixed shaft 57 passes through a hollow portion of movable member 53 and spring 56, and is rotatably attached to an outer side face of case 55 by stopper ring 58, configuring opening and closing mechanism 60.

Opening and closing mechanism 60 as configured above is assembled in an electronic device such as a mobile phone (not illustrated). Fixing section 51A of fixed member 51 is attached to a fixed housing (not illustrated) where keys, a microphone, and so on are formed. Case 55 is attached to a movable housing (not illustrated) where a display, speaker, and so on are formed. With this opening and closing mechanism 60, the movable housing is supported relative to the fixed housing in an openable and closable fashion, configuring the electronic device.

In the above structure, spring 56 applies a force in a closing direction to movable member 53 when the tips of movable cams 54 are resiliently contacting lower sloped portions 52B of fixed cams 52, as shown in FIG. 4. The movable housing, to which case 55 is attached, is thus retained in a closed state relative to the fixed housing.

When the movable housing is opened by hand from this closed state, case 55 attached to the movable housing rotates, and movable member 53 rotates as it moves in the axial direction inside case 55. The tips of movable cams 54 then ride over protrusions 52A of fixed cams 52, and resiliently contact upper sloped portions 52C. This applies a force in an opening direction to movable member 53, and thus this force applies a force in the opening direction to the movable housing. Accordingly, the movable housing is opened at a predetermined angle relative to the fixed housing.

In other words, movable member 53, which has a force imparted thereto by spring 56, is moved in an axial direction by rotating case 55 attached to the movable housing. This makes the tips of movable cams 54 resiliently contact either sloped portions 52B or sloped portions 52C of fixed cams 52, resulting in opening and closing of the movable housing relative to the fixed housing.

One prior art configuration related to the present invention is disclosed in Japanese Patent Unexamined Publication No. 2004-245342.

In order to make the entire size of the above conventional opening and closing mechanism smaller, components such as movable cam 54, fixed cam 52, and spring 56 need to be made smaller. However, these components require a certain degree of size and load in order to ensure reliable opening and closing operations. Accordingly, downsizing of the prior art is difficult.

SUMMARY OF THE INVENTION

An opening and closing mechanism of the present invention solves the above disadvantage. The opening and closing mechanism includes a fixed member which has a fixed cam on its side face; a movable member which has a movable cam on its opposing face to the fixed cam, and which is rotatably disposed relative to the fixed member; a case housing the fixed member and the movable member; and a spring applying a force toward the fixed member to the movable member. The movable member has a recess at its radial center, and the first end of the spring is inserted in this recess.

Furthermore, the present invention includes an electronic device such as a mobile phone as configured below equipped with this opening and closing mechanism. The electronic device includes the opening and closing mechanism, a fixed housing, and a movable housing. The opening and closing mechanism includes a fixed member which has a fixed cam on its side face, and which is attached to the fixed housing; a movable member which has a movable cam on its opposing face to the fixed cam, and which is rotatably disposed relative to the fixed member; a case which houses the fixed member and the movable member, and which is attached to the movable housing; and a spring applying a force toward the fixed member to the movable member. The movable member has a recess at its radial center, and the first end of the spring is inserted in this recess.

Accordingly, with these simple structures, the present invention offers the opening and closing mechanism and electronic device that can be downsized while ensuring reliable opening and closing operations.

DETAILED DESCRIPTION OF THE INVENTION

A preferred embodiment of the present invention is described below with reference to the drawings.

Embodiment

Figure 1:
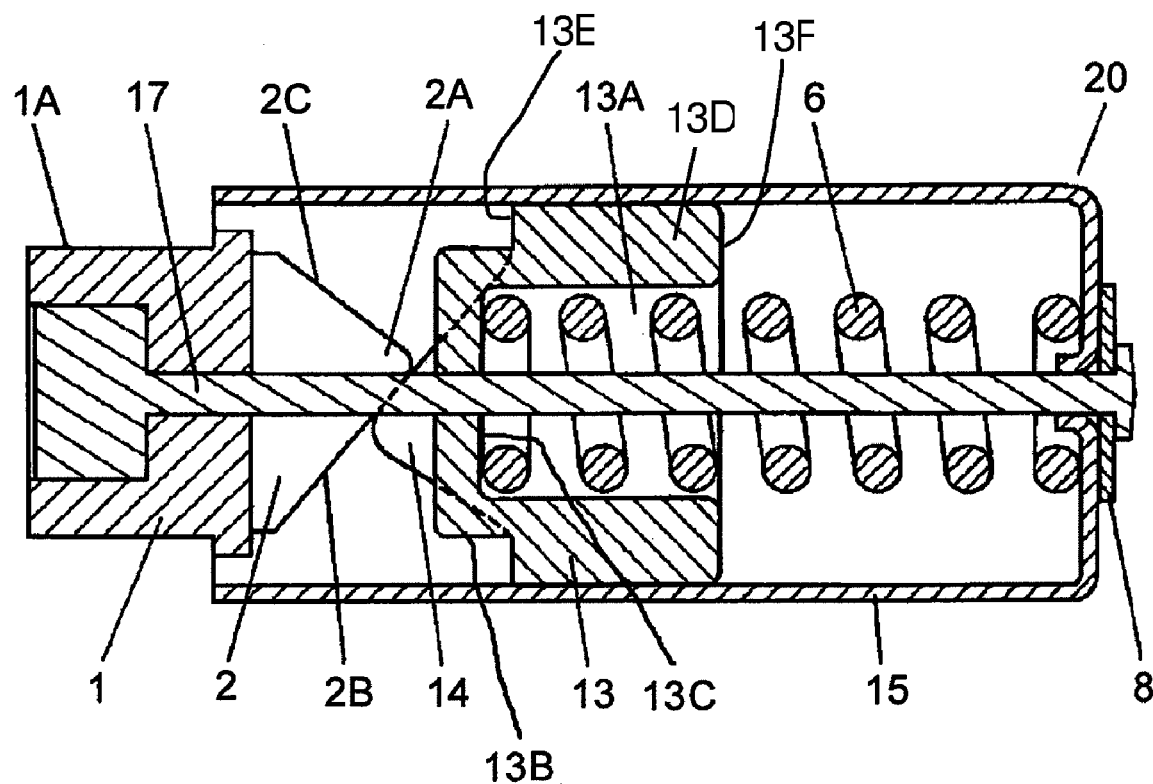
FIG. 1 is a sectional view of an opening and closing mechanism in a preferred embodiment of the present invention.
Figure 2:
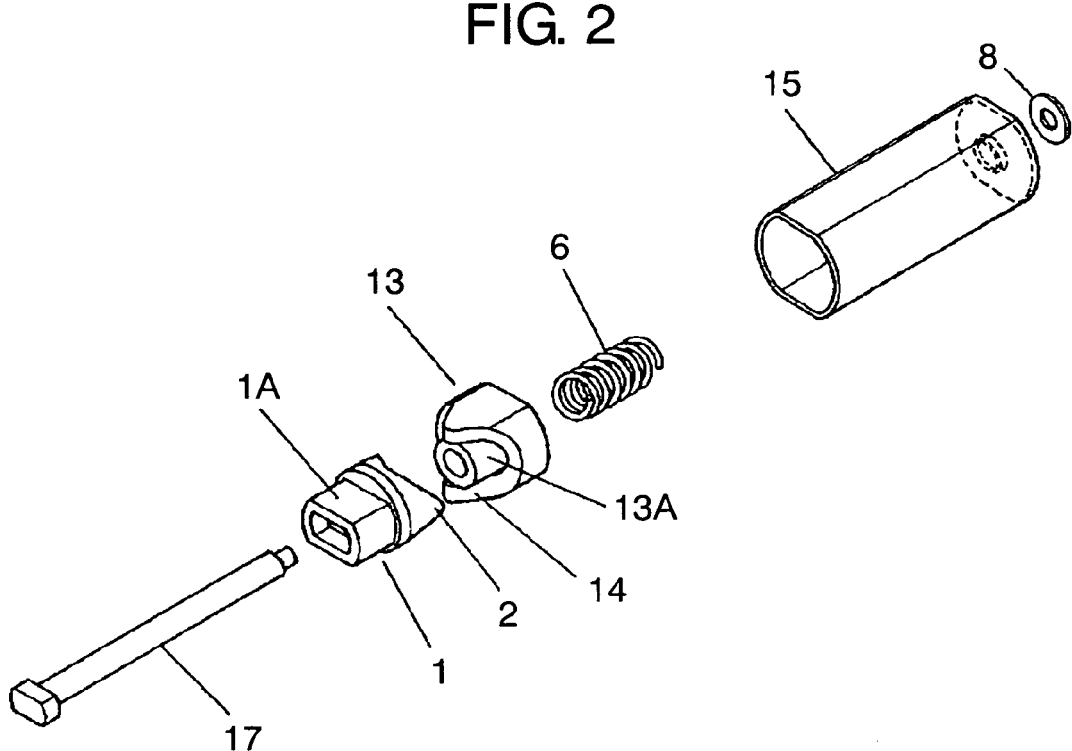
FIG. 2 is an exploded perspective view of the opening and closing mechanism.

FIG. 1 is a sectional view and FIG. 2 is an exploded perspective view of an opening and closing mechanism in the preferred embodiment of the present invention. In the drawings, the sectional view is radially enlarged for easier understanding of the relation between a fixed cam and a movable cam.

In the drawings, fixed member 1 is roughly cylindrical and made of metal such as steel, copper alloy, or sintered alloy, or of synthetic resin. Fixing section 1A is formed on a left side face of fixed member 1. A pair of fixed cams 2 are provided symmetrically on the periphery of a right side face of fixed member 1. Each of these fixed cams 2 is configured with protrusion 2A and two sloped portions 2B and 2C extending upward and downward from this protrusion 2A.

Movable member 13 is also roughly cylindrical and made of metal or synthetic resin. Movable member 13 is disposed in a rotatable fashion in opening and closing directions and also in an axially-movable fashion relative to fixed member 1. A pair of movable cams 14 are provided symmetrically on the periphery of a left side face of movable member 13, which is an opposing face to fixed cams 2 of fixed member 1. Also, recess 13A extending toward movable cams 14 is provided at the radial center of a right side face of this movable member 13.

These fixed member 1 and movable member 13 are housed in roughly cylindrical case 15 made of metal. Furthermore, coil spring 6 made of coiled steel wire is set between recess 13A at the center of movable member 13 and an inner side face of case 15. A left end (first end) of this spring 6 is inserted in recess 13A of movable member 13, and its right end (second end) contacts an inner side face of case 15. This spring 6 is slightly compressed when disposed, and thus applies a leftward force (toward the fixed member) to movable member 13 so that tips of movable cams 14 resiliently contact sloped portions 2B of fixed cams 2.

Figure 4:
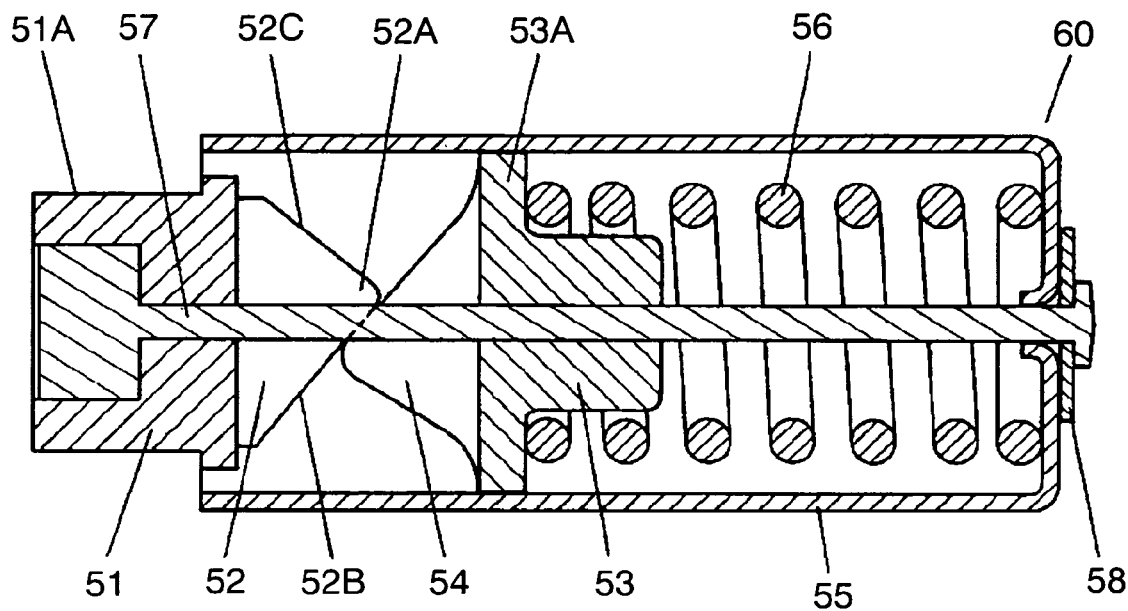
FIG. 4 is a sectional view of a conventional opening and closing mechanism.
Figure 5:
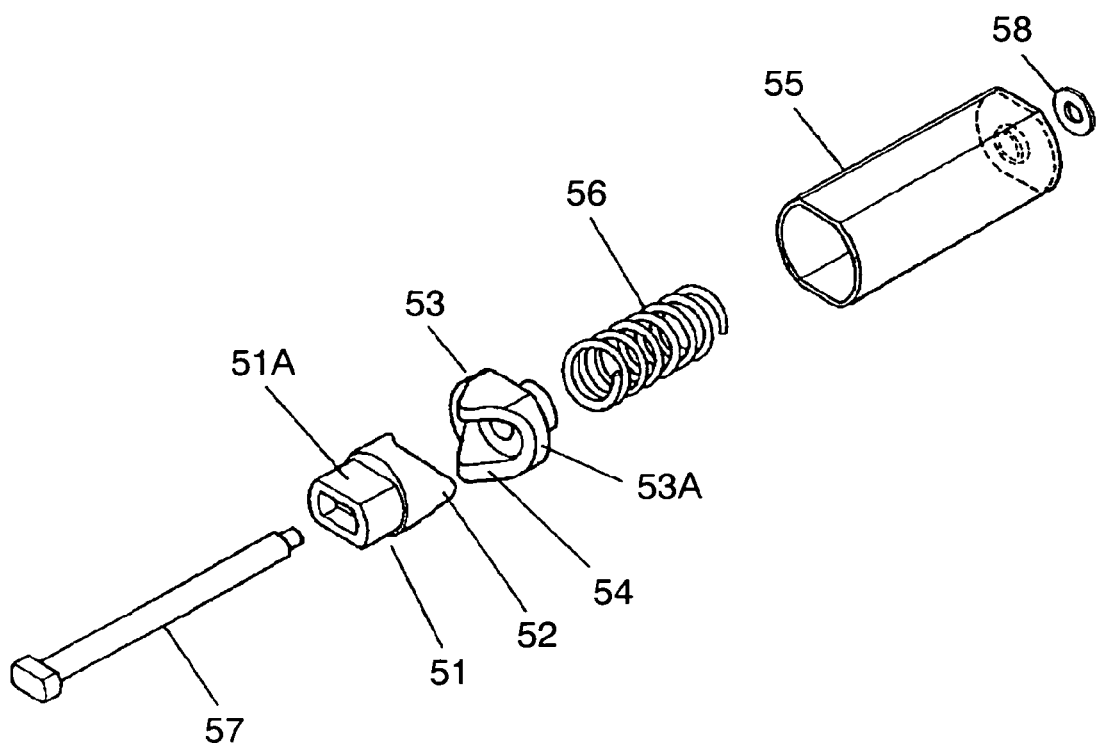
FIG. 5 is an exploded perspective view of the conventional opening and closing mechanism.

In comparison of opening and closing mechanism 20 in the preferred embodiment with the prior art described with reference to FIG. 4, recess 13A is provided at the radial center of the right side face of movable member 13, and spring 6 is inserted in this recess 13A. Also, this recess 13A is configured to extend toward movable cam 14. Accordingly, this structure shortens a dimension in an axial direction for the length corresponding to a thickness of latching part 53A in FIG. 4 and a portion of recess 13A extending toward movable cam 14 in FIG. 1.

In other words, provision of recess 13A at the center of movable member 13 allows shortening of a dimension in an axial direction without reducing sizes of components such as movable cams 14, fixed cams 2, and spring 6; and without reducing a force applied to the movable member by spring 6. This ensures reliable opening and closing operations. Accordingly, a dimension of case 15 in a horizontal direction, i.e., a dimension in the axial direction, can be reduced, making the mechanism smaller.

Furthermore, a left end (first end) of roughly cylindrical fixed shaft 17 is secured to fixed member 1. Fixing section 1A of this fixed member 1 rotatably protrudes from a left side face of case 15. A right end (second end) of fixed shaft 17 passes through a hollow portion of movable member 13 and spring 6, and is rotatably supported on an outer side face of case 15 by stopper ring 8, configuring opening and closing mechanism 20.

Figure 3:
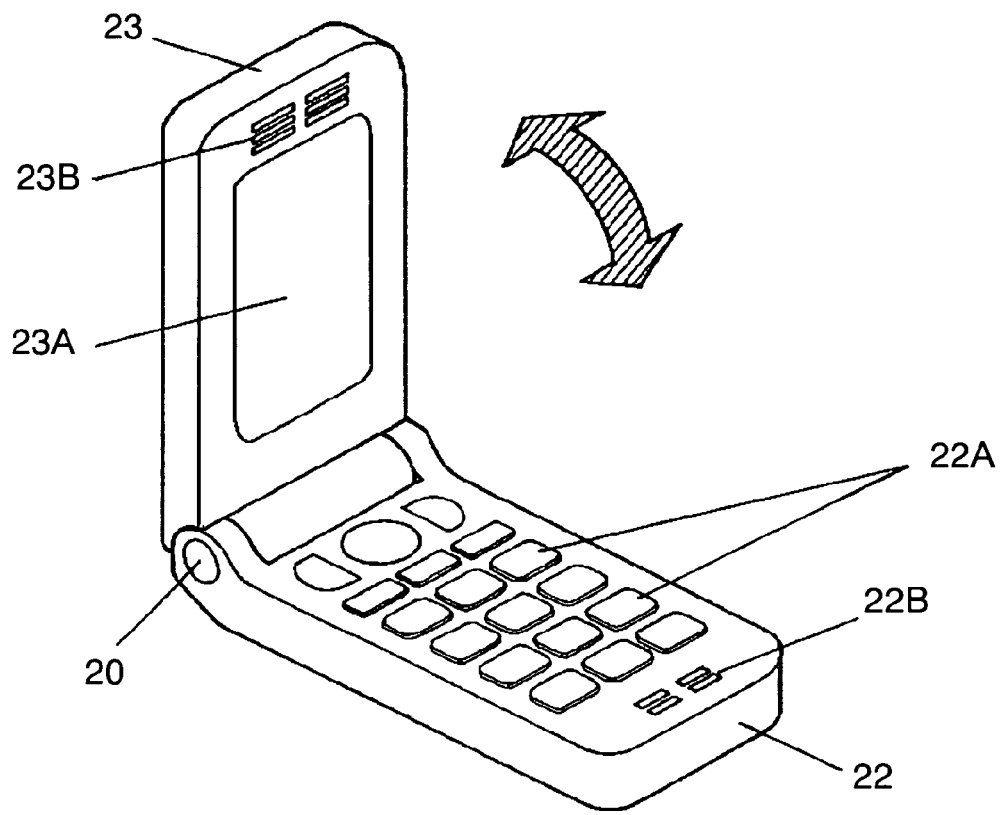
FIG. 3 is a perspective view of an electronic device (mobile phone) in the preferred embodiment of the present invention.

FIG. 3 is a perspective view of an electronic device (mobile phone) in which this opening and closing mechanism 20 is assembled. Fixing section 1A of fixed member 1 is attached to fixed housing 22 of the electronic device. Operating panel 22A such as keys and voice input section 22B such as a microphone are formed on a top face of fixed housing 22. Case 15 is attached to movable housing 23 of the electronic device. Display 23A such as an LCD and voice output section 23B such as a speaker are formed on the surface of movable housing 23. Accordingly, in this electronic device, movable housing 23 is supported relative to fixed housing 22 in an openable and closable fashion by opening and closing mechanism 20, as shown by the arrow in FIG. 3.

In the above structure, spring 6 applies a downward force in a closing direction to movable member 13 when the tips of movable cams 14 resiliently contact lower sloped portions 2B of fixed cams 2. Accordingly, movable housing 23, to which case 15 is attached, is retained in a closed state relative to fixed housing 22.

When movable housing 23 is opened by hand from this closed state, case 15 attached to movable housing 23 rotates, and movable member 13 rotates as it moves in an axial direction inside case 15. The tips of movable cams 14 then ride over protrusions 2A of fixed cams 2, and resiliently contact upper sloped portions 2C. This applies a force in an opening direction to movable member 13, and thus this force applies a force in the opening direction to movable housing 23. Accordingly, movable housing 23 is opened at a predetermined angle relative to fixed housing 22.

In other words, movable member 13 is moved in an axial direction by rotating case 15 attached to movable housing 23. This makes the tips of movable cams 14, due to a force applied thereto by spring 6, resiliently contact sloped portions 2B or 2C of fixed cams 2, resulting in opening and closing of movable housing 23 relative to fixed housing 22.

Here, as described above, the dimension of opening and closing mechanism 20 in the axial direction is actually smaller than what is shown in the drawing. Since the sizes of components, such as movable cams 14, fixed cams 2, and spring 6, and the load required for opening and closing operations are secured, a resilient contact and movement of movable cams 14 relative to fixed cams 2 are ensured.

In the preferred embodiment, recess 13A extending toward movable cams 14 is provided at the center of movable member 13, and spring 6 is disposed between this recess 13A and the inner side face of case 15. Movable member 13 includes a first portion 13D slidable on the case and having a first surface 13E located at an outer periphery thereof and facing the fixed member 1, and a second surface 13F opposite the first surface 13E. Movable member 13 further includes a second portion (axially protruding cylindrical portion) 13B protruding leftwardly in FIG. 1 from the first surface 13E and being located on the rotation axis. As shown in FIG. 1, recess 13A is defined in movable member 13 and is coaxial with the rotation axis. The recess 13A has an open end and a closed end, the open end opening through the second surface 13F, and the closed end defining a recess bottom 13C. As shown, the recess bottom 13C is located, in a direction along the axial direction, closer to the fixed member 1 than at least a part of the first surface 13E of the first portion 13D of the movable member. This allows reduction of a dimension of the mechanism in the axial direction without reducing sizes of components such as movable cams 14, fixed cams 2, and spring 6, and the load. Accordingly, the present invention offers the opening and closing mechanism that can be downsized while ensuring reliable opening and closing operations.

What is claimed is:

1. An opening and closing mechanism comprising:
    a fixed member including a fixed cam on its side face;
    a movable member rotatably disposed relative to the fixed member for rotation about a rotation axis extending in an axial direction;
    a case, the fixed member and the movable member being housed in the case; and
    a spring applying a force toward the fixed member to the movable member, the spring constituting a coil spring having first and second ends;
    wherein the movable member includes
        a first portion slidable on the case, the first portion having a first surface facing the fixed member and a second surface opposite to the first surface, the first surface being located at an outer periphery of the first portion,
        a second portion constituting a cylinder projecting from the first surface of the first portion toward the fixed member, the second portion being located on the rotation axis and spaced inwardly away from the case, and
        a movable cam projecting from the first surface of the first portion toward the fixed member, the movable cam surrounding the second portion, the movable cam being engaged with the fixed cam;
    wherein the movable member has a recess therein that is coaxial with the rotation axis of the movable member and that opens in the axial direction away from the fixed member, the recess having an open end and a closed end, the open end opening through the second surface, and the closed end constituting a recess bottom, the recess extending from the second surface toward the second portion;
    wherein the recess has an inner circumferential diameter greater than an outer circumferential diameter of the spring;
    wherein the first end of the spring is inserted in the recess and contacts the recess bottom to be urged by the recess bottom, the second end of the spring contacting the case; and
    wherein the recess bottom is located, in a direction along the axial direction, closer to the fixed member than at least a part of the first surface of the first portion of the movable member.

2. The opening and closing mechanism of claim 1, wherein the fixed cam includes a protrusion on an opposing face to the movable cam, and two sloped portions extending from the protrusion in a direction opposite to the opposing face.

3. The opening and closing mechanism of claim 1 further comprising:
    a fixed shaft whose first end is secured to the fixed member, the fixed shaft extending in the axial direction;
    wherein the fixed shaft passes through the spring, and a second end of the fixed shaft is rotatably supported on the case.

4. The opening and closing mechanism of claim 1, wherein the movable member is configured to move in the axial direction upon rotation of the case relative to the fixed member.

5. An electronic device comprising:
    a fixed housing;
    a movable housing; and
    an opening and closing mechanism comprising
        a fixed member including a fixed cam on its side face, the fixed member being attached to the fixed housing,
        a movable member rotatably disposed relative to the fixed member for rotation about a rotation axis extending in an axial direction,
        a case, the fixed member and the movable member being housed in the case, the case being attached to the movable housing, and
        a spring applying a force toward the fixed member to the movable member;
    wherein the movable member includes
        a first portion slidable on the case, the first portion having a first surface facing the fixed member and a second surface opposite to the first surface, the first surface being located at an outer periphery of the first portion,
        a second portion constituting a cylinder projecting from the first surface of the first portion toward the fixed member, the second portion being located on the rotation axis and spaced inwardly away from the case, and
        a movable cam projecting from the first surface of the first portion toward the fixed member, the movable cam surrounding the second portion, the movable cam being engaged with the fixed cam;
    wherein the movable member has a recess that is coaxial with the rotation axis of the movable member and that opens in the axial direction away from the fixed member, the recess having an open end and a closed end, the open end opening through the second surface, and the closed end constituting a recess bottom, the recess extending from the second surface toward the second portion;
    wherein the recess has an inner circumferential diameter greater than an outer circumferential diameter of the spring;
    wherein the first end of the spring is inserted in the recess, and contacts the recess bottom to be urged by the recess bottom, the second end of the spring contacting the case; and
    wherein the recess bottom is located, in a direction along the axial direction, closer to the fixed member than at least a part of the first surface of the first portion of the movable member.

6. The electronic device of claim 5, wherein the fixed cam includes a protrusion on an opposing face to the movable cam, and two sloped portions extending from the protrusion in a direction opposite to the opposing face.

7. The electronic device of claim 5 further comprising a fixed shaft whose first end is secured to the fixed member, the fixed shaft extending in the axial direction;
    wherein the fixed shaft passes through the spring, and a second end of the fixed shaft is rotatably supported on the case.

8. The electronic device of claim 5, wherein the movable member is configured to move in the axial direction upon rotation of the case relative to the fixed member.

* * * * *